Jan. 25, 1966    J. S. DEBROTNIC ET AL    3,230,964
FLUID COUPLING UNIT
Filed Aug. 20, 1963
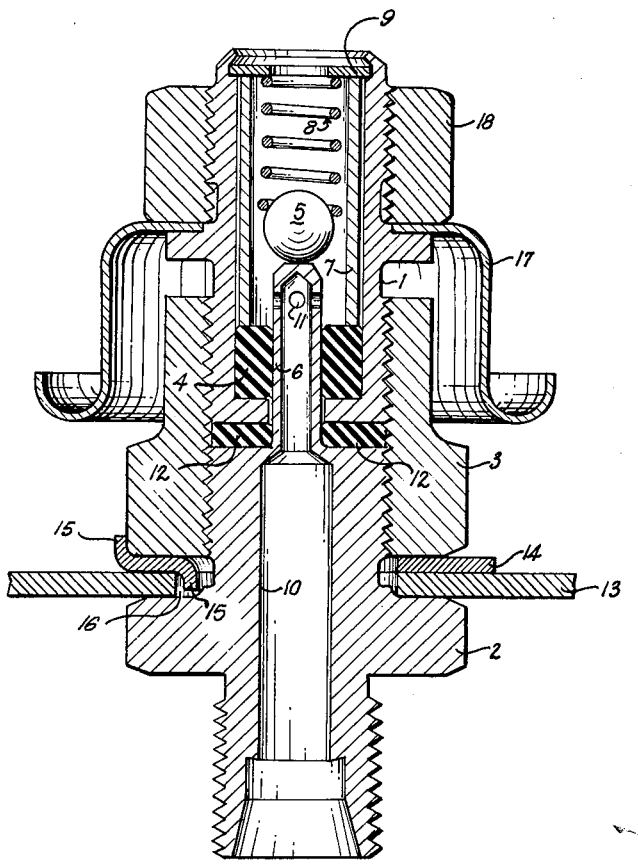
INVENTORS
JOHN S. DEBROTNIC
HARTWELL G. STOLL
BY L E Carnahan
AGENT

United States Patent Office 3,230,964
Patented Jan. 25, 1966

3,230,964
FLUID COUPLING UNIT
John S. Debrotnic and Hartwell G. Stoll, Seattle, Wash., assignors to The Boeing Company, Seattle, Wash., a corporation of Delaware
Filed Aug. 20, 1963, Ser. No. 303,324
1 Claim. (Cl. 251—149.5)

This invention relates to fluid couplings and more particularly to a fluid coupling provided with an automatically acting valve which in the uncoupled state is closed and in the coupled state is open.

The demands made on such couplings are manifold. Thus, for instance, a rapid release disconnection and connection of the coupling parts without loss of the medium (liquid, gas or the like) contained in the associated system must be possible, for, should such a loss occur, the coupling would be useless for many purposes.

The fluid coupling of the instant invention is of the type utilized on pressurized fluid containers with a system which utilizes pressurized fluid such as the rain repellent system on a 727 aircraft.

Even the above requirements, quite apart from a number of other necessary conditions, are not fulfilled by the hitherto known constructions. The coupling according to this invention, however, fulfills all requirements and occurring working conditions.

Further features and advantages of the invention will be gathered from the following description and drawings in which the single figure is a cross-sectional view of the instant invention.

The fluid coupling basically comprises a valve body portion 1 and a receptacle body portion 2 interconnected by an adapter 3 which is threadedly connected with each of body portions 1 and 2. Body portion 1 is provided with a chamber within which a rubber seal 4 defines a seat for a ball check or closure element 5 in the unactuated position (not shown) and prevents leakage from within the chamber of body portion 1. Seal 4 and body portion 1 are provided with a passageway extending therethrough through which a shaft portion 6 of body 2 passes when body portions 1 and 2 are interconnected.

A spacer 7 is positioned within the chamber of body portion 1 and protrudes into seal 4 assuring a good seal between seal 4 and body 1. Ball check 5 is positioned within spacer 7 and held against shaft 6 (or seal 4 when in a closed no-flow condition) by a spring 8 which is held by a washer or retainer 9, retainer 9 being held in body 1 by swaging the upper portion of said body.

Receptacle body 2 is provided with a longitudinal bore 10 having various diameter portions as shown and terminating within shaft portion 6. The shaft 6 has a plurality of apertures 11 therethrough which allow fluid to pass from body portion 1 to body portion 2 when body portions 1 and 2 are interconnected.

Positioned between body portions 1 and 2 is a rubber gasket 12 which functions as a secondary seal when the receptacle body portion is mated with the valve body portion 1.

As shown, the receptacle portion of the fluid coupling of this invention is mounted on a support 13 by positioning receptacle body portion 2 through an aperture in support 13 and lock washer 14, positioning gasket 12 around shaft portion 6 and threading adapter 3 on body 2. Lock washer 14 prevents adapter 3 from rotation by inserting a tab 15 thereof in a keyway 16 of support 13 and another tab 15 being bent onto the flat of hex adapter 3.

To attach the valve portion of the coupling, body 1 is threaded into adapter 3. As the threads are engaged, shaft portion 6 of body 2 forms a seal with the inside diameter of seal 4. At further engagement of the threads, the top of shaft 6 unseats ball 5. The bottom face of body 1 contacts gasket 12 upon further threading thus forming a secondary seal to preclude the leakage of system fluid, should the primary seal 4 fail.

As stated above the fluid coupling unit is adapted to be used with pressurized fluid containers and thus is designed to be mounted on such a container by means of securing a cup 17 to body portion 1 by a torqued threaded nut 18 to maintain constant pressure between body 1 and cup 17 and swaging cup 17 to a pressurized fluid container as indicated by legend in the drawing.

From the foregoing it is clear that threading body portion 1 into adapter 3 moves ball check 5 from its seat on seal 4 and allows fluid to flow from the associated container through apertures 11 in shaft portion 6 and down through bore 10 of body portion 2 to conduit means operatively connected to the threads at the lower end of body 2.

It has thus been shown that the instant invention provides a fluid coupling unit that allows passage of fluid from a pressurized container to a point of use and which includes a valving mechanism and seal means which prevent leakage both during and after engagement of the pressurized container with the remainder of the system, as well as disengagement of the unit from the container without loss of fluid.

Although a particular embodiment of the invention has been illustrated and described, it will be obvious to those skilled in the art that various changes and modifications may be made without departing from the invention, and it is intended to cover in the appended claim all such changes and modifications that come within the true spirit and scope of the invention.

What we claim is:

In a rain repellent system, a fluid coupling comprising: a male body having a flange portion, an elongated end portion and a fluid passageway extending substantially therethrough, said elongated end portion having at least one aperture therein, said aperture being operatively connected with said passageway, and a gasket operatively positioned around said elongated end portion; an interconnecting body operatively connected to said male body and adapted to hold a support means against said male body flange portion; and a female body operatively connected to said interconnecting body and having a flange portion, means operatively connected with said female body and adapted to hold a fluid container against said female body flange portion, said female body defining a chamber therein and a passageway therethrough, a spacer postioned in said chamber, seal means positioned in said chamber and held against the end of said chamber by said spacer and a retainer, and poppet means resiliently mounted within said spacer, said seal means defining a seat for said poppet means.

References Cited by the Examiner
UNITED STATES PATENTS
2,305,286  12/1942  Ward _____ 222—394
2,320,719   6/1943  Davies _____ 251—149.7
2,350,681   6/1944  Heywood _____ 251—149.5

FOREIGN PATENTS
635,238  1/1962  Canada.
 12,150  5/1913  Great Britain.

M. CARY NELSON, Primary Examiner.